(12) United States Patent
Woodall (10) Patent No.: US 7,365,796 B1
(45) Date of Patent: Apr. 29, 2008

(54) SYSTEM AND METHOD FOR VIDEO SIGNAL DECODING USING DIGITAL SIGNAL PROCESSING

(75) Inventor: Neil Woodall, Newport Beach, CA (US)

(73) Assignee: Pixelworks, Inc., Tualatin, OR (US)

( * ) Notice: Subject to any disclaimer, the term of this patent is extended or adjusted under 35 U.S.C. 154(b) by 505 days.

(21) Appl. No.: 10/851,521

(22) Filed: May 20, 2004

Related U.S. Application Data (60) Provisional application No. 60/472,314, filed on May 20, 2003, provisional application No. 60/472,312, filed on May 20, 2003, provisional application No. 60/472,280, filed on May 20, 2003, provisional application No. 60/472,311, filed on May 20, 2003.

(51) Int. Cl.
    *H04N 7/00* (2006.01)
(52) U.S. Cl. .................................... 348/508
(58) Field of Classification Search ............... 348/508, 348/497, 537, 540, 547; 375/354, 355
    See application file for complete search history.

(56) References Cited

U.S. PATENT DOCUMENTS

| 3,860,952 | A |   | 1/1975  | Tallent et al. |         |
|-----------|---|---|---------|----------------|---------|
| 4,196,445 | A |   | 4/1980  | Okada et al.   |         |
| 4,443,821 | A |   | 4/1984  | Kato           |         |
| 4,641,180 | A |   | 2/1987  | Richter        |         |
| 4,675,724 | A |   | 6/1987  | Wagner         |         |
| 4,855,815 | A |   | 8/1989  | Yasuki et al.  |         |
| 5,097,321 | A |   | 3/1992  | Stern et al.   |         |
| 5,121,203 | A |   | 6/1992  | Citta          |         |
| 5,121,207 | A |   | 6/1992  | Herrmann       |         |
| 5,134,467 | A |   | 7/1992  | Kim            |         |
| 5,142,377 | A |   | 8/1992  | Moriyama et al.|         |
| 5,231,478 | A |   | 7/1993  | Fairhurst      |         |
| 5,260,839 | A |   | 11/1993 | Matsuta et al. |         |
| 5,345,276 | A |   | 9/1994  | Hong           |         |
| 5,355,176 | A |   | 10/1994 | Inagaki et al. |         |
| 5,359,366 | A |   | 10/1994 | Ubukata et al. |         |
| 5,367,338 | A |   | 11/1994 | Rothermel et al.|        |
| 5,394,193 | A |   | 2/1995  | Kim            |         |
| 5,418,818 | A | * | 5/1995  | Marchetto et al.| 375/264|
| 5,506,932 | A | * | 4/1996  | Holmes et al.  | 704/205 |
| 5,525,984 | A |   | 6/1996  | Bunker         |         |
| 5,526,129 | A |   | 6/1996  | Ko             |         |
| 5,600,379 | A | * | 2/1997  | Wagner         | 348/497 |
| 5,686,972 | A |   | 11/1997 | Kim            |         |
| 5,710,729 | A |   | 1/1998  | Feste et al.   |         |
| 5,748,842 | A | * | 5/1998  | Holmes et al.  | 704/270 |
| 5,909,255 | A |   | 6/1999  | Hatano         |         |
| 5,940,138 | A |   | 8/1999  | Lowe           |         |
| 5,953,071 | A |   | 9/1999  | Van Zon        |         |
| 5,963,268 | A | * | 10/1999 | Ko             | 348/556 |

(Continued)

FOREIGN PATENT DOCUMENTS

JP                 0449501 A     10/1991

(Continued)

*Primary Examiner*—Paulos M. Natrael
(74) *Attorney, Agent, or Firm*—Marger Johnson & McCollom, P.C.

(57) ABSTRACT

A digital signal processing based decoder is disclosed. The decoder asynchronously samples video signals. By doing so, the decoder can work in pseudo real-time and without analog interface components improving performance while reducing cost.

26 Claims, 8 Drawing Sheets

U.S. PATENT DOCUMENTS

| | | |
|---|---|---|
| 5,990,978 A | 11/1999 | Kim et al. |
| 6,052,748 A * | 4/2000 | Suominen et al. ............ 710/57 |
| 6,173,003 B1 | 1/2001 | Whikehart et al. |
| 6,175,389 B1 | 1/2001 | Felts |
| 6,208,671 B1 * | 3/2001 | Paulos et al. ................ 370/545 |
| 6,297,849 B1 | 10/2001 | Stessen et al. |
| 6,300,985 B1 | 10/2001 | Lowe |
| 6,462,790 B1 | 10/2002 | Lowe et al. |
| 6,581,164 B1 * | 6/2003 | Felts et al. .................. 713/400 |
| 6,614,474 B1 | 9/2003 | Malkin et al. |
| 6,714,717 B1 | 3/2004 | Lowe et al. |
| 6,744,472 B1 | 6/2004 | Macinnis et al. |
| 6,774,954 B1 | 8/2004 | Lee |
| 6,795,001 B2 | 9/2004 | Roza |
| 6,795,126 B1 | 9/2004 | Lee |
| 6,804,697 B2 | 10/2004 | Bugeja et al. |
| 6,956,620 B2 | 10/2005 | Na |
| 7,102,692 B1 * | 9/2006 | Carlsgaard et al. ......... 348/572 |

FOREIGN PATENT DOCUMENTS

| | | |
|---|---|---|
| JP | 0549375 A | 6/1993 |

* cited by examiner

SYSTEM AND METHOD FOR VIDEO SIGNAL DECODING USING DIGITAL SIGNAL PROCESSING

1. PRIORITY INFORMATION

This application claims priority from U.S. Provisional Application Nos. 60/472,314; 60/472,312; 60/472,280; and 60/472,311, all filed May 20, 2003, which we incorporate here by reference.

BACKGROUND

1. Field

This invention relates to signal decoding and, more particularly, to a system and method for video signal decoding using digital signal processing (DSP).

2. Related Art

Composite and S-video signal formats dominate home theater interconnect applications. Composite video signals, as the name implies, combine the three basic elements of a video picture (color, brightness, and synchronization signals) into a single composite signal. S-video is often incorrectly referred to as S-VHS since it first came into home use with the introduction of VHS tape format. Professionals prefer the name Y/C video rather than S-video since it is more clearly descriptive of the signal format. S-video signals comprise luminance (Y or luma) signals indicative of the black and white portion of the image (i.e., brightness), chrominance (C or chroma) indicative of the color portion of the image (i.e., hue and saturation), and vertical and horizontal synchronization signals. Manipulation of the composite and S-video signals allows image control. For instance, manipulation of Y and C components may sufficiently produce any image.

A decoder samples the composite and S-video signals using a clock locked to a synchronization signal (line locked decoding) or a color burst frequency. If locked to the color burst frequency, the decoder uses a phase-locked loop (PLL), a voltage controlled crystal oscillator (VCO), or a digitally tuned oscillator (DTO) to sample the composite and S-video signals. The sampling frequency must be controlled in real-time and in a manner that produces a stable clock otherwise the signals will produce an image with banding and other artifacts that adversely affect display quality.

If the input is a composite signal, the sampled signal is then processed through a Y/C separator to produce an S-video signal. A demodulator then demodulates the chroma portion of the S-video signal (original or processed). Typical demodulation techniques, like quadrature amplitude demodulation, multiply the chroma signal by a signal either in phase or 90 degrees out of phase with the color burst, and then filter the result using a low-pass filter. The result is a demodulated UV signal that is ready for color space conversion. Due to the sampling frequency control requirement, however, the above approach is not easily adaptable with common, off-the-shelf, digital signal processors, increasing the decoder's overall cost.

Accordingly, a need remains for an improved SYSTEM and method for video signal decoding using digital signal processing.

DETAILED DESCRIPTION

The following description illustrates embodiments of the present invention. Numerous other embodiments are contemplated and the description is intended only to illustrate, and not limit, the present invention.

The present invention relates to a video decoder designed to meet video quality level requirements of up-converting a video signal to computer or high definition television (HDTV) resolutions. By sampling the signal asynchronously, the decoder works in pseudo real-time and without analog interface components. Asynchronous sampling, as used here, comprises a fixed sample clock frequency. Put differently, asynchronous sampling relates to sampling without locking to the video signal, e.g., without locking to the vertical or horizontal synchronization signals of the video signal. The video decoder allows use of previously unacceptable lower precision analog-to-digital converters (ADCs), e.g., 8 bit ADCs, to perform like higher precision ADCs, e.g., 10 bit ADCs. And the video decoder performs substantial signal processing with little or no performance degradation.

The video decoder may use a sample rate a factor, e.g., eight, larger than required for CCIR-601 style decoding. (CCIR stands for Comite Consultatif International des Radio, a predecessor organization to the International Telecommunications Union (ITU), an organization responsible for obtaining international agreement on standards for ratio and television transmission.) The high sample rate allows the decoder to re-use the ADCs used for red/green/blue (RGB) graphics signals and/or high definition television (HDTV) signals. And the high sample rate allows on-chip anti-alias filters that may reject noise or crosstalk generated both on and off chip, increasing compatibility with system-on-chip designs that process RGB, HDTV, and standard definition television (SDTV) signals used by the video decoder.

Figure 1:
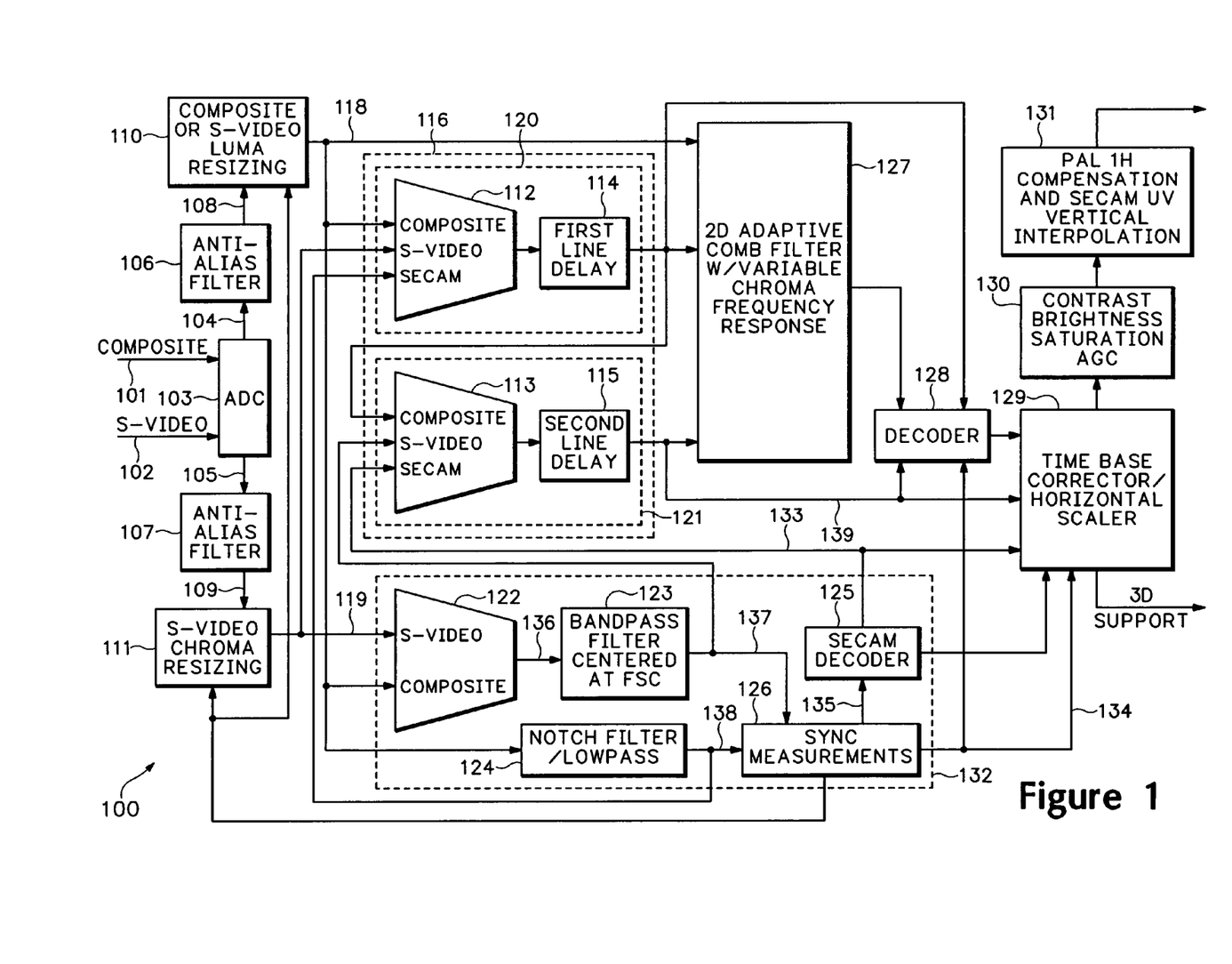
FIG. 1 is a block diagram of a decoder system embodiment.

FIG. 1 is a block diagram of a decoder 100. A composite signal 101 or an S-video analog signal 102 is digitized through an analog-to-digital converter (ADC) 103. A person of reasonable skill in the art should recognize that other types of signals may be provided to the ADC 103, e.g., Sequential Couleur A'Memorie (SECAM), and/or Phase Alternating Line (PAL) signals. A person of reasonable skill in the art should recognize that the composite signal 101 or the S-video signal 102 may be provided through separate or single lines depending on the application. A person of reasonable skill in the art should recognize that the ADC 103 may be one, two, or more separate components depending on the application. The ADC 103 generates a digitized composite signal 104 of varying size, e.g., 8 bits. The ADC 103 likewise generates a digitized S-video signal 105 of varying size, e.g., 8 bits. The ADC 103 may use a fixed or variable frequency sampling clock.

Although the ADC 103 may determine system performance, the signal processing described below is not dependent on ADC type. In an embodiment, the ADC is an 8-bit ADC with a high sample rate, e.g., 108 MHz. A person of reasonable skill in the art should recognize that other ADC bit widths and sample rates are possible with modifications to the decoder 100, including the anti-alias filters 106 and 107. We describe an embodiment of the ADC 103 in co-pending patent application titled System and Method For Improving Performance Of An A/D Converter, filed herewith and commonly assigned to Pixelworks, Inc. We incorporate this application by reference. A person of reasonable skill in the art should recognize other designs for the ADC 103 as coming within the scope of the present invention.

An anti-alias filter 106 filters the digitized composite signal 104. Likewise, an anti-alias filter 107 filters the digitized S-video signal 105. The anti-alias filters 106 and 107 may operate as low pass filters, isolating lower frequency video signals from higher frequency RGB graphics and HDTV signals. By doing so, the anti-alias filters 106 and 107 increase signal to noise ratio and precision. Increasing the ADC sample rate likewise improves precision and reduces noise and crosstalk if the ADC signal to noise ratio remains constant. And the anti-alias filters 106 and 107 include notches in their frequency response to eliminate digital noise from the input source (e.g., from bad digital to analog reconstruction filters), the system (e.g., from ground loops), and from internal switching noise. The overall impact is to significantly reduce the integration problems and costs associated with combining a video decoder with other video and graphics processing functions. We describe an embodiment of the anti alias filters 106 and 107 in co-pending patent application titled System and Method For Improving Performance Of An A/D Converter, filed herewith and commonly assigned to Pixelworks, Inc. We incorporate this application by reference. A person of reasonable skill in the art should recognize other designs for the anti alias filters 106 and 107 as coming within the scope of the present invention.

The decoder 100 comprises a plurality of scalars, e.g., horizontal scalars 110 and 111. The horizontal scalar 110 scales the filtered composite signal 108 and the luma portion of the filtered S-video signal 109. The horizontal scalar 111 scales the chroma portion of the filtered S-video signal 109. A person of reasonable skill in the art should recognize that the scalars 110 and 111 may be implemented using a variety of well-known scaling algorithms and technologies, including using polyphase filters. The decoder 100 requires no specific type of scalar, but the particular type of scalar used will affect the decoder 100's decoding quality. More particularly, the scalars 110 and 111 may affect the decoder 100's amplitude versus phase characteristics at the color sub-carrier frequency. Variations in amplitude versus sampling phase will cause changes in saturation and hue, typically seen as moving diagonal bands in the displayed image. The anti-alias filters 106 and 107 and scalars 110 and 111 may be combined in a single, multi-tap polyphase filter. The design of scalars 110 and 111 is well known to a person of reasonable skill in the art and we will not discuss it in any further detail.

A delay line 116 provides a constant delay regardless of whether the input signal is a composite, S-video, or is in any other signal format. The delay line may be implemented on-chip, e.g., in a static random access memory (SRAM) or off-chip, e.g., using any convenient memory required for other subsystems on the chip or of the decoder 100.

The delay line 116 includes a first delay line 120 comprising a first multiplexer 112 and a first line delay 114. The delay line 116 includes a second delay line 121 comprising a second multiplexer 113 and a second line delay 115. The first multiplexer 112 provides one of the composite signal 118, S-video signal 119, and SECAM signals 120 to the first line delay 114. Likewise, the second multiplexer provides one of the first line delay 114's output, SECAM decoder 125 output, and bandpass filter 123 output to the second line delay 115. To minimize memory requirements, first and second delay lines 120 and 121 may store only the active portions of the corresponding input signals. Since the sampling frequency of the middle line dominates the Y (luma) frequency response of a filter 127, sample rate reduction on the second delay line 121 minimally impacts final performance.

And the decoder 100 may identify the input signal samples that contribute to the U/V color signal to cut the sample rate for the second delay line 121 in half for some formats of input signals, e.g., PAL signals. For S-video signals, the second delay line 121 may use sub-carrier phase information to only store the U/V samples at a sample rate, e.g., 4×Fsc, lower than the sample rate, e.g., 8×Fsc for storing luma. This allows dual use of line delay memory, for the comb filter 127 and for S-video information, equally. The consistent delay simplifies the output control timing of the decoder 100.

The first and second line delays 114 and 115 may be implemented in a single memory, e.g., SRAM, to minimize memory area requirements in an integrated chip implementing the decoder 100.

Because, on average, the line delay 116 requires three operations, the system clock may be greater than three times the 8×Fsc frequency of PAL, or 105 MHz. The sampling frequency of the ADC 103 may satisfy this requirement by running at or higher than 105 MHz. In an embodiment, the ADC 103's sampling frequency is 108 MHz. For composite signals, the three operations are two reads followed by a write. For S-video signals, the three operations are two reads (luma and chroma) followed by a write (luma) and a read (luma) followed by two writes (luma and chroma). This is possible because the line delay 116 stores only the chroma samples demodulated to U/V.[

Synchronization circuit 132 identifies and generates the synchronization signals necessary to appropriately lock on to the input signals, e.g., composite signal 101 or S-video signal 102. The synchronization circuit 132 includes multiplexer 122, bandpass filter 123, notch/lowpass filter 124, SECAM decoder 125, and synchronization measurement circuit 126. The multiplexer 122 provides either the S-video signal 119 or the composite signal 118 to the bandpass filter 123. The multiplexer 122 may operate responsive to control signals not shown in FIG. 1. Any circuit capable of selecting between a plurality of signals may be used for the multiplexer 122. The design of multiplexer 122 is well known to a person of reasonable skill in the art. We will therefore not discuss the multiplexer 122 in any further detail.

Figure 4:
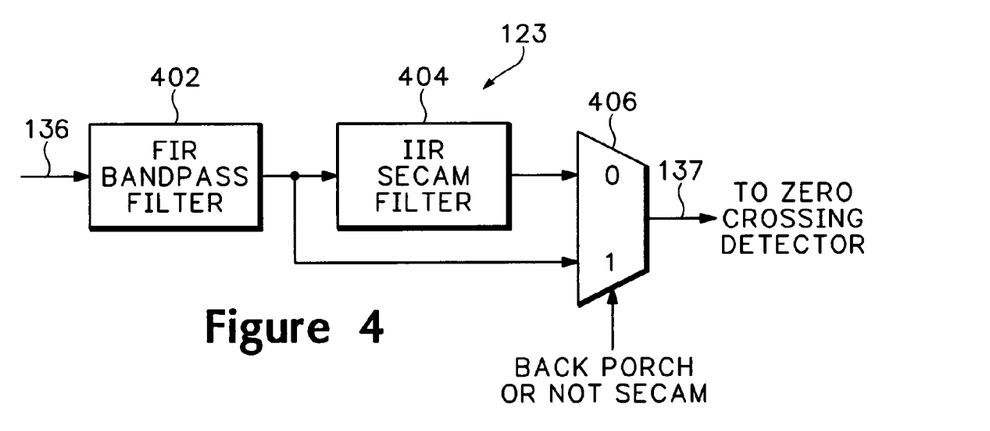
FIG. 4 is a block diagram of FIR filter embodiment.

The bandpass filter 123 may be centered at the sub-carrier frequency Fsc or at other frequencies. FIG. 4 is a block diagram of the bandpass filter 123. Referring to FIGS. 1 and 4, the bandpass filter 123 filters the buffered signal output from the multiplexer 122. The bandpass filter 123 may include a finite impulse response (FIR) filter 402 for filtering the signal 136 before providing the signal 137 to the synchronization measurement circuit 126. The bandpass filter 123 eliminates any DC offsets from the chroma S-video signal 119. During an active portion of the SECAM picture, the bandpass filter 123 may also include an infinite impulse response (IIR) filter 404 that removes the SECAM encoder bell curve pre-emphasis from the frequency response. A multiplexer 406 selects between the signal output from the IIR filter 404 and the signal output from the FIR filter 402 responsive to a control signal that indicates an active image portion.

Figure 5:
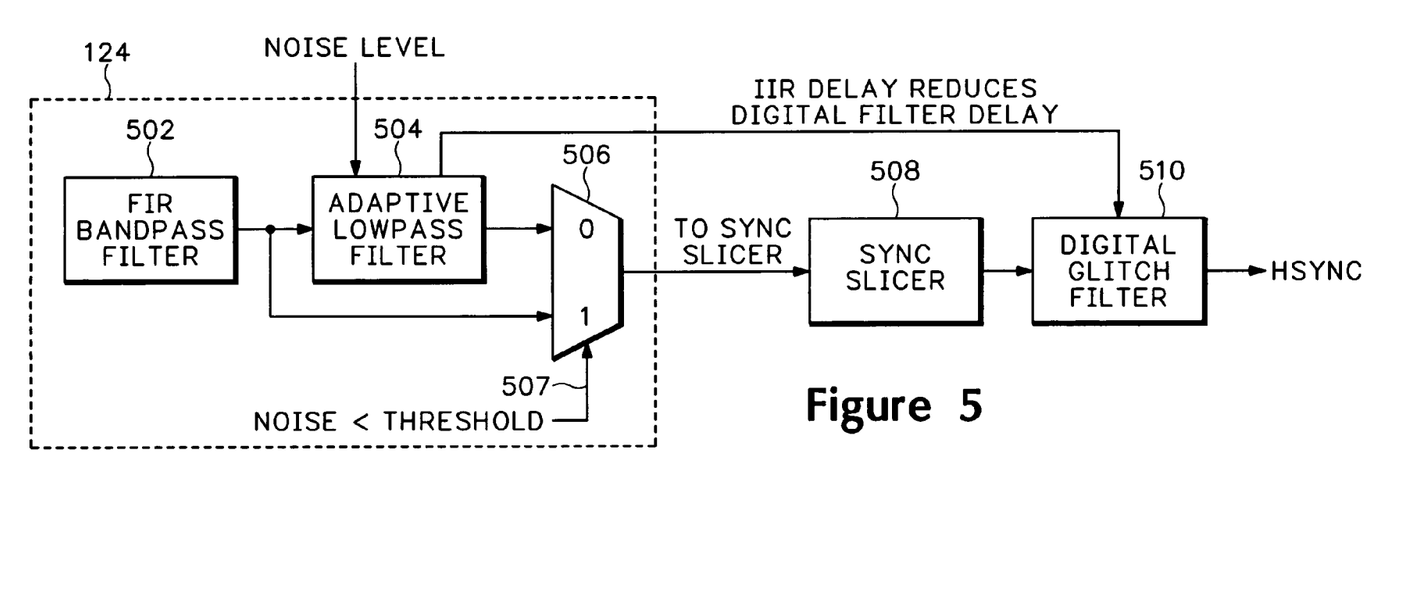
FIG. 5 is a block diagram of a notch/lowpass filter embodiment.

The notch/lowpass filter 124 filters the composite signal 118. FIG. 5 is a block diagram of the notch/lowpass filter 124. Referring to FIGS. 1 and 5, the filter 124 may include a notch or bandpass filter 502 to eliminate the color sub-carrier frequency Fsc. The filter 124 may also include a lowpass filter 504 to reject noise. The lowpass filter 504 may, in turn, comprise both a FIR filter and an adaptive IIR filter (not shown separately from the filter 504). The filter 504 may operate responsive to the input signal noise levels to improve performance. As the noise level increases, the adaptive IIR filter 504 lowers its cut-off frequency to provide better noise rejection. When the noise below a predetermined threshold 507, the IIR filter 504 may be switched out of the path by a multiplexer 506. A sync slicer 508 detects a predetermined point of the synchronization signals, e.g., the 50% slice point, embedded in the signals 118 and 119. The detection of a predetermined point of the synchronization signals allows the sampling phase to match the output, preserving the output frequency up to the Nyquist limit. The output of the sync slicer 508 is further filtered by the filter 510 to remove glitches. As the group delay caused by the adaptive IIR filter 504 increases due to increases in noise levels, the delay through the glitch filter 510 decreases maintaining about constant the total signal delay. The bandpass filter 123 and the lowpass/notch filter 124, therefore, improve the decoder 100's accuracy.

Figure 3:
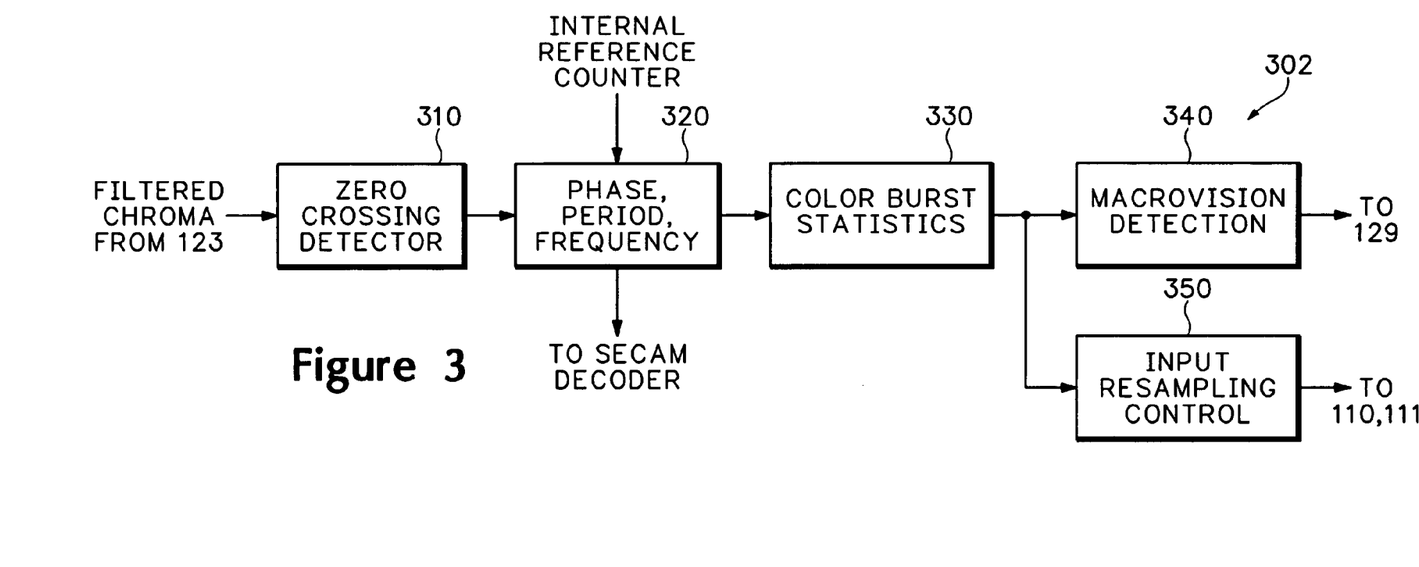
FIG. 3 is a block diagram of a bandpass filter embodiment in the synchronization measurement block shown in FIG. 1.
Figure 6:
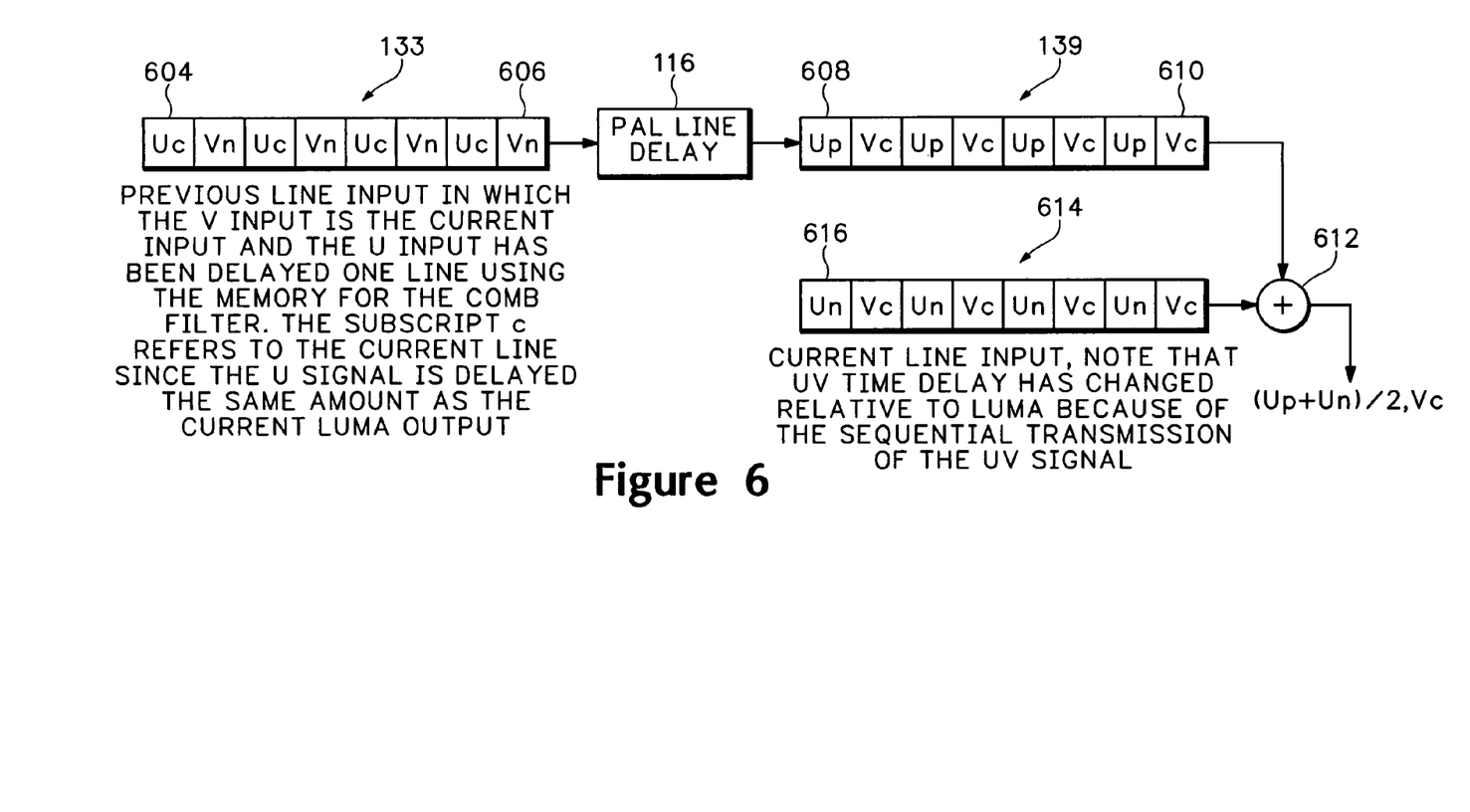
FIG. 6 is a diagram of a PAL delay line embodiment.

Referring to FIGS. 1, 3, and 6, the decoder 100 locks to the color sub-carrier frequency Fsc for amplitude modulated (AM) demodulation and additionally performs the frequency modulated (FM) demodulation for SECAM. For both demodulations, a zero crossing detection circuit 310 (FIG. 3) generates phase and frequency information from the color sub-carrier by calculating zero crossings with sub-pixel accuracy. The method corrects the data then applies a linear interpolation. An exemplary data rate 8× the color sub-carrier frequency Fsc generates a maximum phase error of 0.05 degrees.

The decoder 125 may be implemented in a variety of manners, including using an FM demodulator. The decoder 125 measures the color sub-carrier phase and determines the color sub-carrier frequency Fsc in one instance using the same circuit. This is because the difference between two phase measurements (zero-crossings) equals ½ the period of the signal. The decoder 125 demodulates FM by taking the inverse of this measurement and multiplying by a predetermined constant. The decoder 125 includes equalization filters before and after the demodulator.

And the decoder 125 provides the decoded signal 133 to the delay line 116 to combine the sequential U and V components and to reduce large area flicker with vertical interpolation. Referring to FIG. 6, the UV signal 133 consists of a next line U (or V) 604 and a current line V (or U) 606. The decoder 125 provides the signal 133 to the pal delay line 116, and more particularly, to the second delay line 121. The resulting delayed signal 139 is delayed an additional line resulting in a signal that includes a previous U (or V) line 608 and a current V (or U) line 610. The averager 612 averages the signal 139 with a next line signal 614. The current line 614 has a UV time delay change relative to the luma because of the sequential transmission of the UV signal. That is, the U (or V) 616 remains the current line pixel. By replacing the UV sample that was spatially located on the next line of video with the average pixel from the next and previous lines, the decoder 100 improves color information accuracy.

Figure 7:
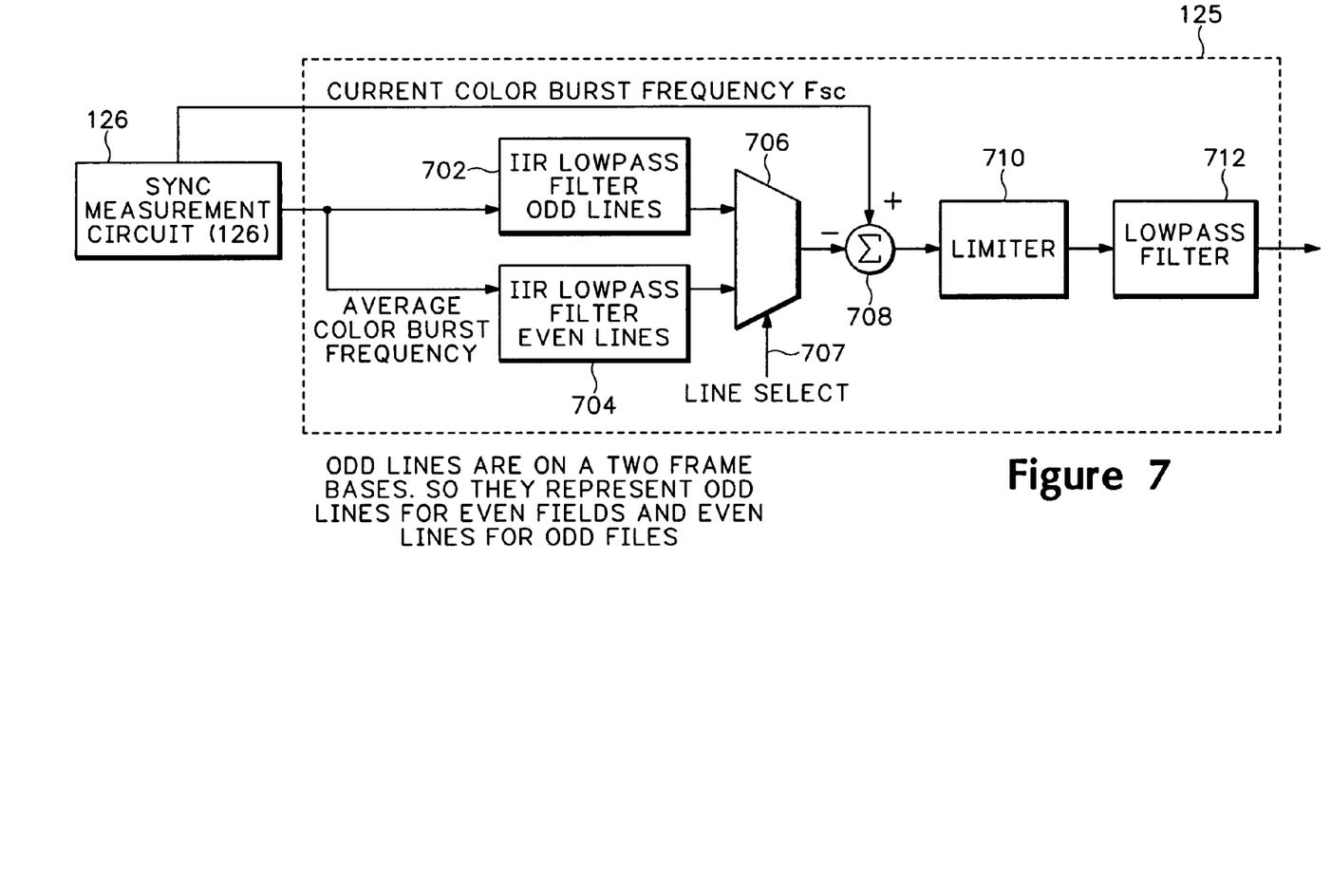
FIG. 7 is a block diagram of a SECAM decoder embodiment.

Because each frame consists of 625 lines for SECAM and the color information transmitted changes on each line, if the current line in the current frame consist of Luma and U data, then the current line on the next frame will consist of Luma and V data. Differences between the interpolated UV data and the current line UV data will result in flicker at, e.g., 25 Hz rate. Because linear interpolation is typically more accurate than pixel replication, the result is a reduction in large area flicker. FIG. 7 is a block diagram of a decoder 125. The decoder 125 includes a limiting circuit 710, a color burst frequency detector 708, and lowpass filters 702, 704, and 712. The decoder 125 input includes the average color burst frequency 703 and the current color sub-carrier frequency Fsc at 705. Two lowpass filters 702 and 704 estimate these decoder required frequency references, one for every other line. The lowpass filter 702 may operate on odd lines while the lowpass filter 704 may operate on even lines. The lowpass filters 702 and 704 may be IIR filters. The filtered signals are multiplexed through the multiplexer 706 that operates responsive to a line select signal 707. The output of the multiplexer 708 is provided to the averager 708. The resulting averaged signal is used on the appropriate lines to create a difference signal 709 between the current frequency for the pixel and the average value. The difference signal 709 is provided to a limiter 710 for limiting to the appropriate range of, e.g., SECAM frequencies. A third lowpass filter 712 filters the signal from the limiter 710 to undo the SECAM per-emphasis used at the time of encoding.

The synchronization block 126 receives the signals output from the filters 123 and 124 and generates control signals 134 that it provides to the time base corrector 129. The synchronization block 126 provides data signals 135 to the decoder 125. The synchronization block 126 includes at least two processing blocks. The first processing block 202 (FIG. 2) is for processing the luma signals while the second processing block 302 (FIG. 3) is for processing chroma signals. The timing for the chroma signal block 202 is determined by the detection of the synchronization signals in the luma block 302.

The synchronization block 126 first detects the horizontal and vertical synchronization signals, determines the video standard, locks to the color sub-carrier, and decodes the color information. Before locking onto the synchronization signals, the signal may need heavy filtering to reject noise, e.g., an IIR filter. Too much filtering, however, degrades the performance of the time base corrector 129. To avoid performance degradation, the synchronization block 126 uses an adaptive approach that changes responsive to the signal input.

Figure 2:
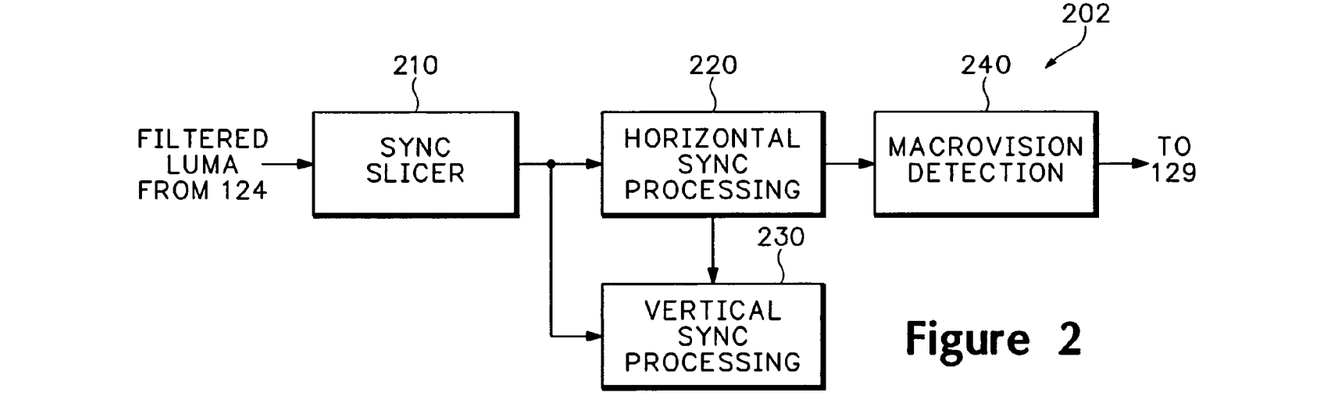
FIG. 2 is a block diagram of a notch/lowpass filter embodiment in the synchronization measurement block shown in FIG. 1.

FIG. 2 is a block diagram of the luma processing block 202. Referring to FIG. 2, the luma processing block 202 comprises a sync slicer 210, horizontal synchronization detector 220, vertical synchronization detector 230, and macrovision detector 240. To prevent initial lock-on problems, the sync slicer 210 averages the back porch level and the sync tip level. The raw slice output captures the luma values just before and after the 50% slice point, allowing sub-pixel resolution (that is, resolution to a pixel fraction).

Before the output is provided to the horizontal synchronization detector 220 and the vertical synchronization detector 230, however, an up/down counter (not shown) filters the signal. The up/down counter stops at zero and a predetermined maximum count determined by the IIR filter 404 in the filter 123, keeping a constant delay notwithstanding the IIR filter choice. This insures rejection of the low frequency undershoots typical of, e.g., video cassette recorders (VCRs), while still maintaining sub-pixel accuracy.

The horizontal synchronization detector 220 detects the horizontal synchronization signal to an expected window or range, thus ignoring vertical synchronization signals and macrovision pulses. If the horizontal synchronization detector 220 does not detect the horizontal synchronization signal over several lines, it extends the range or window to look for synchronization signals that are of appropriate width. The detector 220 determines the start and stop point of the window by the average width for the first synchronization signal detected on each line. If the detector 220 still does not find any horizontal synchronization signal after several more lines, then it will use any synchronization signal to determine the new start point.

When the horizontal synchronization detector 220 detects a predetermined level of random line length variation, it performs time base correction (TBC). With TBC, timing based on the falling edge of the horizontal synchronization signal is more likely correct. Excessive random variation therefore compels using expected, instead of detected, synchronization position. On a next line, the detector 220 adjusts expected synchronization position based on current sync position detection accuracy, namely, if too soon or too late. Since restricting line length variations to pixel accuracy would cause problems with VCRs, additional logic distinguishes between random and VCR caused line length variations.

The vertical synchronization detector 230 detects the vertical synchronization signal using additional filtering on the output from the sync slicer 210. Similar to the sync slicer 210's filter, the vertical synchronization detector 230 comprises an up/down counter (not shown separately from the vertical synchronization processing block 230), with the maximum count equal to ¼ the expected line length in an embodiment. The detector 230 detects the field using one of at least two techniques. In the first more traditional technique, the detector 230 may detect the phase of the vertical synchronization pulse relative to the phase of the horizontal synchronization pulse. In the second, more modern approach, the detector 230 may detect the delay between the last equalization pulse and the first horizontal synchronization signal in the field. The second approach provides better field detection and alignment during VCR trick modes, e.g., fast forward, reverse, and pause than the first approach because it does not rely on the vertical synchronization phase that has been replaced by the VCR.

Macrovision detector 240 may not detect automatic gain control (AGC) pulses directly. Instead, the macrovision detector 240 detects the pseudo synchronization pulses that are associated with the AGC pulses. In an embodiment, the same circuitry that distinguishes between equalization pulses and horizontal synchronization signals or pulses, counts potential equalization pulses on each line. These counts determine and flag the presence of macrovision encoding.

FIG. 3 is a block diagram of the chroma processing block 302. Referring to FIG. 3, the chroma processing block 302 comprises a zero crossing detector 310, a period and frequency determination block 320, a color burst block 330, macrovision detector 340, and input resampling block 350. The zero crossing block 310 and the period and frequency determination block 320 determine the phase and frequency of the color sub-carrier signal. The color burst block 330 may gather statistics (e.g., counts) about the color subcarrier during the color burst and from line to line. The color burst block 330 provides the statistics to the macrovision detector 340 for detection of macrovision signals indicating copyright protection. And the color burst block 330 provides the statistics to control the input resampling block 320 (e.g., a horizontal scalar). Macrovision encoding is well known to a person of reasonable skill in the art.

The zero crossing detector 310 may calculate the zero crossing using a linear interpolation algorithm that has a simple correction built in to compensate for the non-linear nature of the color sub-carrier. In an embodiment, the zero crossing detector 310 adds a predetermined percentage of an average of two samples on either side of zero to the larger of the two values before calculating the zero crossing. The predetermined percentage may be found through simulation to minimize the worst case error. The zero crossing detector 310 substantially reduces the error in estimating the zero crossing, particularly at the 8×Fsc rate, allowing it to be used as FM demodulator for a SECAM input signal.

Figure 8:
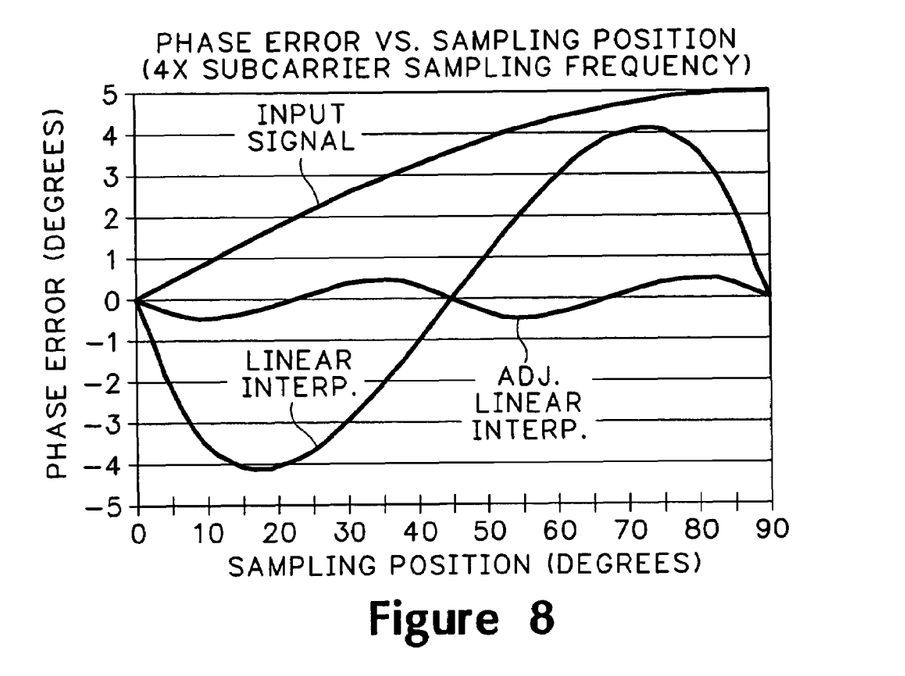
FIGS. 8 and 9 are graphs of sampling position versus phase error for 4×Fsc and 8×Fsc sampling rates, respectively.
Figure 9:
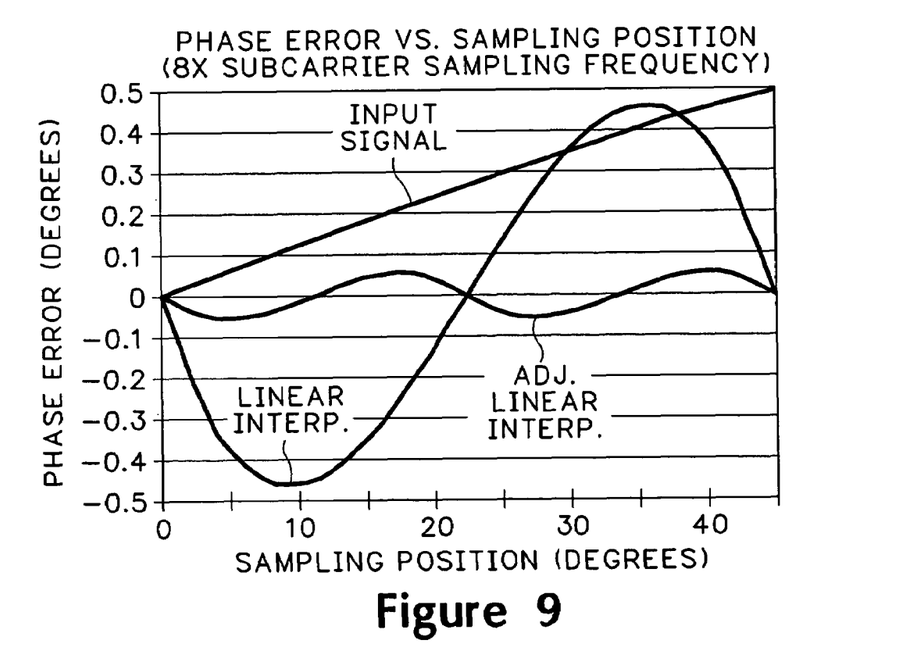

FIGS. 8 and 9 are graphs of sampling position relative to phase error for 4×Fsc and 8×Fsc sampling rates, respectively. FIGS. 8 and 9 show the impact signal adjustment for signals sampled at 4×Fsc and 8×Fsc, respectively. In both cases, the error in the estimated location of the zero crossing is reduced by almost a factor of 10 by adjusting the signal before linear interpolation. The error is small enough at the 8×Fsc rate to allow the circuit to be used as a SECAM FM demodulator as we mentioned above.

Returning to FIGS. 1 and 3, the phase and period detection block 320 takes the fractional phase calculated by the zero crossing block 310 and adds the integer phase value such that it can represent a full error range, e.g., a −180 to +180 degree error. The integer phase value is the output of a counter in which the least significant bit (LSB) represents the phase between the pixels. For PAL signals, the block 320 adds +/−45 degrees to remove swinging burst. Swinging burst is a PAL video term that refers to the situation where the color burst phase swings between +45 to −45 and back on alternate lines of video. It is the detection of this swinging burst that identifies the signal as a PAL encoded signal.

PAL stands for Phase Alternating Line, which means that before the UV component is modulated in the encoder, the V portion on every other line is inverted. That is, the phase of the V component is changed 180 degrees on every other line. When you decode the PAL signal you have to undo this phase shift, which means that you have to identify which lines have been shifted by 180 degrees. This is because the electronics available when color was introduced had the tendency to shift the phase of the signal based on its amplitude. Because the hue (or tint) of the signal is based on the phase, this causes the hue to shift between dark and light portions of the scene. This shifting caused NTSC to be referred to as Never Twice the Same Color. Because the phase shift happens after the picture is encoded, the phase shift has different impacts on different lines of video because of the phase shift in the encoder. The error causes a hue shift in opposite directions after decoding when you undo the 180 degrees added to the V signal. If you average the two lines together, then the hue shift will cancel.

The block 320 determines the maximum and minimum values by how fast the samples are relative to the subcarrier. For example, the detection block 320 counts from −4 to +3 for 8xFsc. Because of the phase's polar coordinate system, the detection block 320 calculates the period by counting the number of samples between zero crossings and then adding the difference of the fractional pulses to that value. Frequency is the inverse of the period. To get true frequency, however, the detection block 320 divides the period into half the expected subcarrier period. Under these conditions, a frequency of one represents a signal equal to the expected subcarrier value.

The color burst block 330 calculates values and provides these values to the macrovision detector 340 and the input resampling control block 350. A person of skill in the art knows well the values calculation involved for AGC and macrovision detection and we will not discuss them in any further detail. Exemplary statistics include color burst amplitude, average color burst phase, average color burst period/frequency, color burst phase reversal, and the number of valid samples within the color burst. To minimize the impact of macrovision color stripes, the decoder 100 may determine color burst phase. Depending on the results, the detector 340 either ignores color burst information or subtracts the phase inversion before using it in the summary statistics. The macrovision detector 340 determines the color burst disturbance, and therefore the level of copy protection support required.

The corrected phase information controls the input horizontal scalar (not shown separately from the input resampling block 350) included in the input resampling block 350, reducing the measured phase error to zero. The input horizontal scalar may be free-running, that is, without start and stop conditions. But the block 350 may only process the active portion of the image, freeing up processing resources and, more particularly, DSP resources for synchronization and color burst measurements.

To provide the demodulation function, the resampling block 350 may use a ratio that is an even multiple of the subcarrier, typically 4xFsc or 8xFsc. Given a base (or default) scaling ratio, the block 350 adds two numbers to the scaling ratio. The first forces measured phase errors to zero. The second reduces the measured frequency errors to zero. The block 350 applies the second number to all the samples it processes.

The block 350 applies the phase error (or first number) to a predetermined number of samples. The number of accumulations, however, is based on the number of output samples. The block 350, therefore, multiplies the phase error by the horizontal scaling ratio. The block 350 applies the phase error in one of at least three techniques. The first involves using DSP to multiply and apply the result to an output sample. The second involves using an application specific integrated circuit (ASIC), either integrated with the decoder 100 or external to the decoder 100, that time shares available scalar multipliers. Some scalar multipliers are not in use during the inactive image time. The third possibility is to divide the phase error by a predetermined large number, e.g., 256, followed by a two stage accumulation. During the first stage, the block 350 accumulates the number of clocks between output samples. During the second stage, the block 350 accumulates the result for 256 output samples. The approach yields accuracy sufficient to determine frequency errors. The accuracy may be, e.g., +/−1 of the 256 samples times the horizontal scaling ratio.

Referring to FIG. 1, the decoder 100 includes an adaptive two-dimensional comb filter 127 with variable chroma frequency response. The comb filter 127 may operate over several lines, e.g., 3 lines. The comb filter 127 detects the vertical and horizontal transistions in the chroma signal. The comb filter 127 may switch between bandpass and wideband filters responsive to vertical or horizontal image transitions. The comb filter 127 may use a narrowband comb filter responsive to intermediate image transitions (that is, intermediate to vertical or horizontal transitions).

The comb filter 127 detects vertical transitions by determining if a middle line bandpass filter matches one of the two-line comb filters better than a 3-line comb filter. For example, at the bottom of the color bars, one of the 2-line comb filters will be the same as the middle line bandpass filter while the 3-line comb filter, because it is an average of the two two-line comb filters will not equal either one. The comb filter 127, therefore, will correctly select the bandpass filter.

The comb filter 127 detects horizontal transitions by looking at the relative signal levels of the different chroma filters, after it subtracts the nominal subcarrier (which we will refer to as leakage). The goal of the comb filter 127's adaptive algorithm is to use the filter with the least amount of leakage. When there is a horizontal transition, the narrow band comb filter and band pass filters will see the transition first, causing the comb filter to adaptively select the wideband comb filter. The comb filter 127 maximizes the chroma frequency response to preserve the image edges. Because the goal is to minimize the amount of leakage, the comb filter 127 will also cause the narrow-band comb filter to be used on diagonal luma edges thereby minimizing the amount of cross-color.

We describe an embodiment of the comb filter 127 in co-pending patent application titled Adaptive Y/C Separator, filed Apr. 27, 2004, and commonly assigned to Pixelworks, Inc. We incorporate this application by reference. A person of reasonable skill in the art should recognize other designs for the comb filter 127 as coming within the scope of the present invention.

Figure 10:
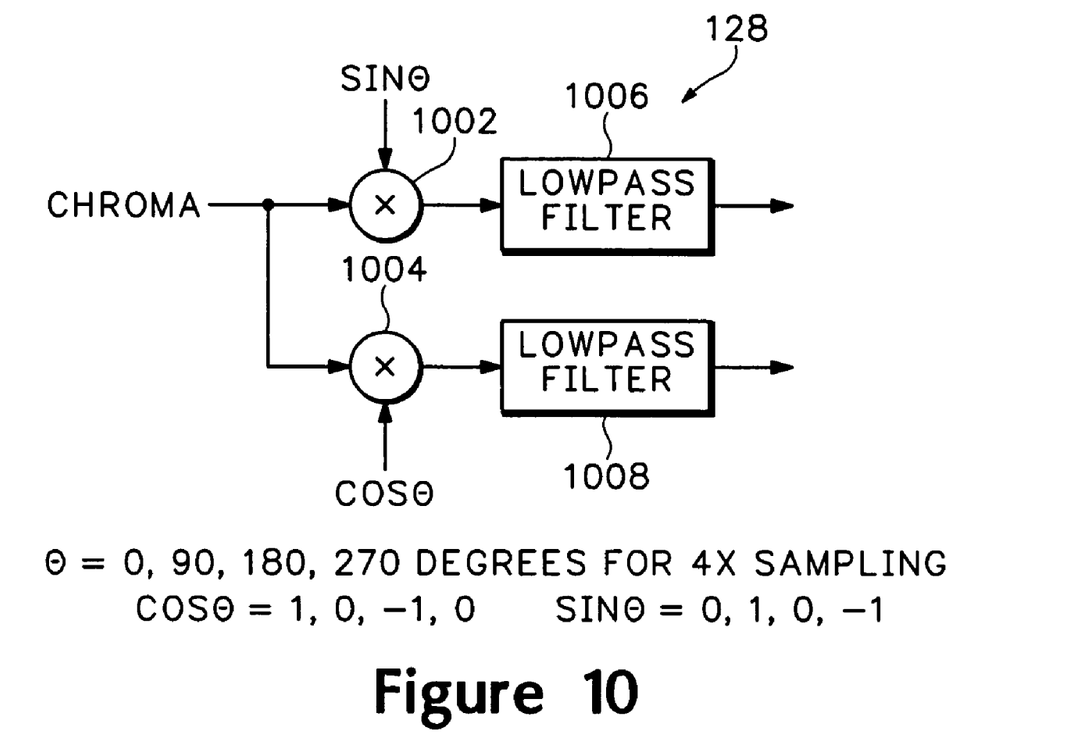
FIG. 10 is a block diagram of a decoder embodiment.

The decoder 128 generates a YUV signal from the Y and C signals it receives from the comb filter 127 and the delayed signal output from the first line delay 120. FIG. 10 is a block diagram of a decoder 128. Referring to FIGS. 1 and 10, the decoder 128 includes multipliers 1002 and 1004 and lowpass filters 1006 and 1008. The decoder 128 may have an AM demodulating function that is a +/−1 multiplication in the 4xFsc case. The decoder 128 may be simplified because the samples that contribute to the U and the V portions of the YUV signal are previously identified by other blocks in the decoder 100. For example, the line delay 116 may only store the samples that contribute to the U and V portions.

The time base corrector 129 operates responsive to the synchronization measurements made by block 126. In an embodiment, the time base corrector 129 does not operate responsive to feedback from the decoder 100's output. The time base corrector 129 is adaptive in that it changes its operation depending on the signal conditions. For example, during VCR trick modes, head switches can occur several times per field. With a traditional approach, the picture would have a significant amount of horizontal timing errors. In the digital domain, however, the time base corrector 129 (and, more generally, the decoder 100) switches off the IIR filter during this mode, confining the horizontal timing errors to the lines containing the head switch. On the other hand, as the signal to noise ratio decreases, the time constant increases such that other field/frame based noise reduction algorithms may be more effective.

We describe an embodiment of the time base corrector 129 in co-pending patent application titled Method And Apparatus For Correction Of Time Base Errors, filed Apr.

27, 2004, and commonly assigned to Pixelworks, Inc. We incorporate this application by reference. A person of reasonable skill in the art should recognize other designs for the time base corrector 129 as coming within the scope of the present invention.

The AGC block 130 controls automatic gain, contrast, brightness, and saturation. The AGC block 130 operates responsive to a user's contrast and saturation preferences as may be determined by the synchronization block 126. More specifically; the digital automatic gain control loop is only implemented for the luma signal if an analog gain control circuit in the block 126 has reached the limits of its adjustment range. At this point, the contrast value may be multiplied by the ratio of the target synchronization tip amplitude divided by the actual synchronization tip amplitude. For the chroma automatic gain control loop, the contrast correction value is further multiplied by the ratio of the detected color burst amplitude divided by the actual color burst amplitude. The AGC 130 adjusts for brightness after subtracting the back porch value from the YUV signal.

The PAL delay line 131 corrects for Hanover Bar artifacts in PAL signals. Similar to the line delay 116, the PAL delay line 131 stores samples in the active portion of the image. The block 131 may additionally vertically interpolate SECAM signals. This works by noting that the delay line 116 has already previously delayed the SECAM signal by one line in the luma domain and either one or no lines in the chroma domain. The block 131 delays the chroma line by one resulting in either an input sample that has already been delayed by one line or the average of an (un-delayed) input sample and corresponding line delay output.

Figure 11:
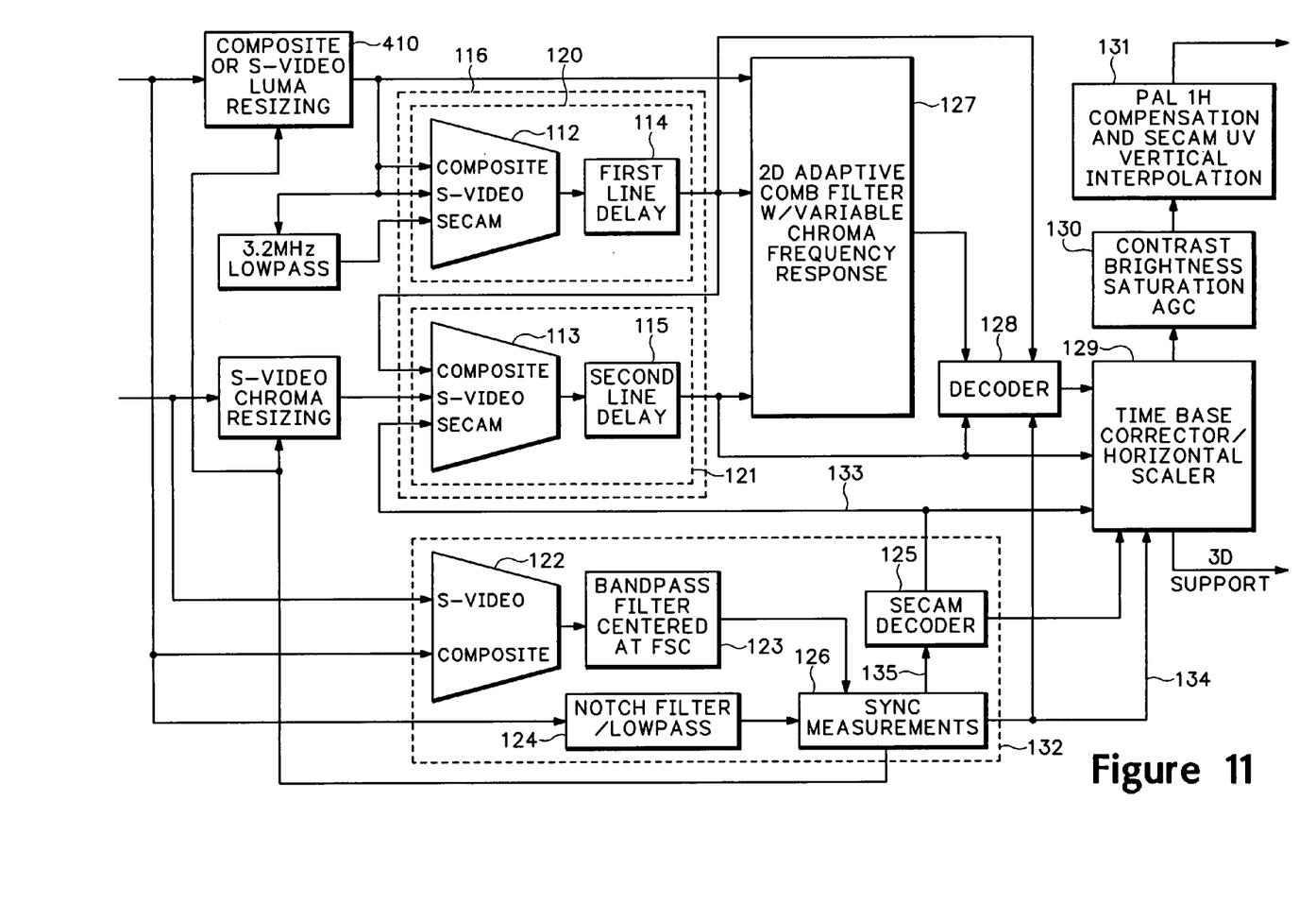
FIG. 11 is a block diagram of a decoder system embodiment.

The decoder 100 does not comprise feedback loops. The decoder 1100 (FIG. 11), on the other hand, comprises a feedback loop around the input horizontal scalar 410. For example, the color burst measurements and FM demodulator could process the data at the input data rate right after the anti-alias filters 106 and 107. While feedback simplifies the system design, the backend TBC 129 may replace the feedback loop. However, an embodiment without a feedback loop around the input scalars may complicate the filter design and require a higher data processing rate (about 3× to 4×). Another embodiment eliminates the input horizontal scalars 110 and 111, using a line locked demodulator after the comb filter 127.

For relatively clean video, e.g., VCR and cable, the detector 100 assumes the detected synchronization position is correct and applies filtering only in the time base corrector 129. As the noise level increases, so does the time constant of the IIR filter for the start position, to minimize the impact of small errors.

Embodiments of the invention have been described using block diagrams. A person of reasonable skill in the art should recognize that particular functional blocks in one diagram may be used in other diagrams. And a person of reasonable skill in the art should recognize that embodiments of the invention may be implemented in hardware, software, and a combination thereof.

While this invention has been illustrated with reference to its preferred embodiments, those skilled in the art will understand that various changes in form and details may be made without departing from the spirit and scope of the invention as defined by the appended claims.

I claim:

1. A video decoder comprising:
an input line to receive video signals; and
a digital signal processing circuit connected to the input line to asynchronously sample the video signals;
where the digital signal processing circuit includes a delay line to delay the video signals by at least a first delay;
where the delay line comprises:
a first delay line to delay the video signals by the first delay; and
a second delay line to delay the video signals by a second delay;
where the first delay line comprises:
a first multiplexer to select one of the video signals; and
a first line delay to delay a signal output from the first multiplexer; and
where the second delay line comprises:
a second multiplexer to select from a plurality of input signals; and
a second line delay to delay a signal output from the second multiplexer.

2. The video decoder of claim 1 where the digital signal processing circuit does not lock to the video signals.

3. The video decoder of claim 1
where the digital signal processing circuit includes an anti-alias filter to filter the video signals.

4. The video decoder of claim 1
where the digital signal processing circuit includes a horizontal scalar to horizontally scale the video signals.

5. A video decoder comprising:
an input line to receive video signals; and
a digital signal processing circuit connected to the input line to asynchronously sample the video signals;
where the digital signal processing circuit includes a synchronization circuit to generate a synchronization signal; and
where the synchronization circuit comprises:
a first filter to filter at least one of a luma and chroma signals;
a second filter to filter the luma signal;
a decoder to decode a signal output from the first filter; and
a synchronization measurement circuit to generate synchronization signals associated with the signal output from the first filter and a signal output from the second filter.

6. The video decoder of claim 5 where the first filter comprises:
a bandpass filter;
a SECAM filter to filter a SECAM signal; and
a multiplexer to select one of a signal output from the bandpass filter and the SECAM filter.

7. The video decoder of claim 6
where the bandpass filter is a FIR filter; and
where the SECAM filter is an IIR filter.

8. The video decoder of claim 5 where the second filter comprises:
a bandpass filter;
an adaptive lowpass filter that operates responsive to a noise level in the video signals; and
a multiplexer to select one of a signal output from the bandpass filter and the adaptive lowpass filter responsive to a predetermined threshold.

9. The video decoder of claim 8 where the bandpass filter is a FIR filter.

10. The video decoder of claim 5 where the decoder comprises:
a first lowpass filter to filter odd lines;
a second lowpass filter to filter even lines;
a multiplexer to select one of a signal output from the first lowpass filter and the second lowpass filter responsive to a line select signal; and an averager to average a signal output from the multiplexer with a color burst frequency.

11. The video decoder of claim 5 where the synchronization measurement circuit comprises:
a first processing block to process a luma signal; and
a second processing block to process a chroma signal, the second processing block including a zero crossing detector.

12. The video decoder of claim 11 where the zero crossing detector comprises a linear interpolation circuit.

13. The video decoder of claim 5
where the digital signal processing circuit comprises an adaptive comb filter coupled to a line delay.

14. The video decoder of claim 13 where the digital signal processing circuit comprises a decoder circuit coupled to the adaptive comb filter.

15. The video decoder of claim 14 where the digital signal processing circuit comprises a time base corrector coupled to the decoder circuit.

16. A method comprising:
receiving a video signal;
sampling the video signal asynchronously using a digital signal processor; and
filtering at least one of a luma and a chroma signals using a first filter;
filtering the luma signal using a second filter;
decoding a signal output from the first filter; and
generating synchronization signals associated with the signal output from the first filter and a signal output from the second filter.

17. The method of claim 16 comprising digitally processing the video signal without locking on to the video signal.

18. The method of claim 16 comprising:
horizontally scaling the video signal.

19. The method of claim 16 comprising:
delaying the video signal by at least a first delay.

20. The method of claim 19 where delaying comprises:
first delaying the video signal by the first delay; and
second delaying the video signal by the second delay.

21. The A method of claim 16 comprising:
generating a synchronization signal.

22. The method of claim 21 where generating includes detecting a zero crossing on the video signal using linear interpolation.

23. The method of claim 16 comprising:
adaptively comb filtering the video signal.

24. The method of claim 16 comprising:
decoding the video signal after adaptively comb filtering.

25. The method of claim 16 comprising:
time base correcting after decoding the video signal.

26. The method of claim 16 comprising:
anti-alias filtering the video signal.

* * * * *

UNITED STATES PATENT AND TRADEMARK OFFICE
CERTIFICATE OF CORRECTION

PATENT NO.         : 7,365,796 B1
APPLICATION NO.    : 10/851521
DATED              : April 29, 2008
INVENTOR(S)        : Neil Woodall It is certified that error appears in the above-identified patent and that said Letters Patent is hereby corrected as shown below:

Column 14, line 13, the words "The A" should read -- The --.

Signed and Sealed this

Eighth Day of September, 2009

David J. Kappos
*Director of the United States Patent and Trademark Office*